US009002768B2

(12) United States Patent
Fedorov

(10) Patent No.: US 9,002,768 B2
(45) Date of Patent: Apr. 7, 2015

(54) HUMAN-COMPUTER INTERFACE SYSTEM

(76) Inventor: Mikhail Fedorov, Cerritos, CA (US)

(*) Notice: Subject to any disclaimer, the term of this patent is extended or adjusted under 35 U.S.C. 154(b) by 351 days.

(21) Appl. No.: 13/470,284

(22) Filed: May 12, 2012

(65) Prior Publication Data

US 2013/0300645 A1    Nov. 14, 2013

(51) Int. Cl.
*G06N 5/02* (2006.01)
*G06F 3/01* (2006.01)

(52) U.S. Cl.
CPC ... *G06N 5/02* (2013.01); *G06F 3/01* (2013.01)

(58) Field of Classification Search
CPC ........ G06F 3/01; G06Q 30/02; G06N 99/005; G06N 5/02; G06N 5/003; G06N 5/04; G06N 5/005
USPC ...................... 706/44–54; 345/156
See application file for complete search history.

(56) References Cited

U.S. PATENT DOCUMENTS

| | | | |
|---|---|---|---|
| 5,367,454 A * | 11/1994 | Kawamoto et al. ........... 715/706 |
| 5,991,735 A | 11/1999 | Gerace | |
| 6,697,457 B2 | 2/2004 | Petrushin | |
| 7,720,784 B1 * | 5/2010 | Froloff ............................. 706/47 |
| 7,949,529 B2 | 5/2011 | Weider et al. | |
| 2003/0055654 A1 * | 3/2003 | Oudeyer ....................... 704/275 |
| 2003/0067486 A1 * | 4/2003 | Lee et al. ....................... 345/751 |
| 2003/0078505 A1 * | 4/2003 | Kim et al. ..................... 600/485 |
| 2004/0039483 A1 * | 2/2004 | Kemp et al. ................... 700/245 |
| 2005/0088981 A1 * | 4/2005 | Woodruff et al. ............. 370/260 |
| 2007/0074114 A1 * | 3/2007 | Adjali et al. .................. 715/706 |
| 2008/0052080 A1 * | 2/2008 | Narayanan .................... 704/270 |
| 2008/0249968 A1 * | 10/2008 | Flinn et al. ........................ 706/14 |
| 2009/0063154 A1 * | 3/2009 | Gusikhin et al. .............. 704/260 |
| 2009/0249441 A1 * | 10/2009 | Garbow et al. .................... 726/1 |
| 2010/0030714 A1 * | 2/2010 | Bollano et al. .................. 706/12 |
| 2011/0191273 A1 | 8/2011 | Grabarnik et al. | |
| 2011/0231182 A1 * | 9/2011 | Weider et al. ...................... 704/9 |

OTHER PUBLICATIONS

Cowie, R. et al., "Emotion Recognition in Human-Computer Interaction", IEEE Signal Processing Magazine, Jan. 2001, pp. 32-80.*
Fragopanagos N. et al., "Emotion recognition in human-computer interaction", Neural Networks, 18, 2005, pp. 389-405.*
Jaimes A. et al., "Multimodal human-computer interaction: A survey", Computer Vision and Image Understanding, 108, 2007, pp. 116-134.*
Brave S. et al., "Emotion in Human-Computer Interaction", 2003, pp. 53-68.*
Karray F. et al., "Human-Computer Interaction: Overview on State of the Art", International Journal on Smart Sensing and Intelligent Systems, vol. 1, No. 1, Mar. 2008, pp. 137-159.*

* cited by examiner

*Primary Examiner* — Jeffrey A. Gaffin
*Assistant Examiner* — Dave Misir

(57) ABSTRACT

A human-computer interface system which includes a computer, the computer includes a central processing unit, a first memory, a second memory, at least one storage device, a system hub, an input/output adapter for connecting the at least one storage device to the system hub, an operating system installed onto the at least one storage device, applications software installed onto the at least one storage device, a communication network, the computer being connected to the communication network, a means for inputting and detecting data and commands generated by a user, a plurality of output converters, and a means for allowing the computer to develop and express the computer's emotional states.

11 Claims, 6 Drawing Sheets

| JOY ||
|---|---|
| DATE/TIME STAMP | EMOTION VALUE |
| 01/01/2011 | 57% |
| 01/10/2011 | 83% |
| 01/21/2011 | 17% |
| 01/22/2011 | 18% |
| 01/23/2011 | 19% |
| 01/24/2011 | 11% |
| 01/25/2011 | 7% |
| 01/26/2011 | 10% |

HUMAN-COMPUTER INTERFACE SYSTEM

RELATED APPLICATIONS

There are no previously filed, nor currently any co-pending applications, anywhere in the world.

BACKGROUND OF THE INVENTION

1. Field of the Invention

The present invention relates generally to information communication systems and, more particularly, to a human-computer interface system.

2. Description of the Related Art

Many psychologists believe there are eight main classifications of emotions, also called basic emotions. These basic emotions consist of trust, anger, disgust, fear, happiness/joy, sadness, surprise, and anticipation. Happiness is a human reaction to the positive, as disgust is to the revolting, and surprise is to the unexpected. Similarly, humans react to aversion through anger, to danger through fear, and to difficulty or loss through sadness.

All other emotions are variations of one or more basic emotions. For example, depression and grief are varieties of sadness. Pleasure is a variety of happiness, and horror is a variety of fear. According to psychological experts, secondary emotions form by combining varying degrees of basic emotions. Thus, surprise and sadness produce disappointment, while disgust and anger produce contempt. In addition, multiple emotions can produce a single emotion. For example, anger, love, and fear produce jealousy.

Each emotion is characterized by physiological and behavioral qualities, which include, but are not limited to, movement, posture, voice, facial expression, and pulse rate fluctuation. Fear is characterized by trembling and tightening of the muscles. Sadness tightens the throat and relaxes the limbs. Surprise is characterized by gaping eyes and a dropped jaw, which only lasts a moment and is most often succeeded by another type of emotion.

People have become very familiar and comfortable with exchanging both information and emotions in regular interaction with other people. Furthermore, people's interaction with pets is based mostly on emotions with little information flow, but is still considered natural and induces positive feelings. On the other hand, the emotion-less nature of interaction with machines makes it more difficult to establish communication, understand and accept the informational stream, and enjoy the process.

To address the above-identified problem, applicant's proposed solution creates an emotional engine for machines that are computerized and have a human-machine interface. This emotional engine enriches the process of the machine communicating with people, fulfilling their natural expectation of the emotional stream complementing information. In this fashion, people will find it easier to understand, accept and like the machine. Ultimately, this may lead to accelerated acceptance and faster penetration of new technologies, with positive impact on people's balance of intellect and emotions.

The prior art teaches various information communication systems, and more particularly image, visualization, pattern, document, and speech recognition and verification systems and methodologies. However, the prior art fails to teach a system for emotionally enriching man-computer communication/interaction in the manner disclosed and taught by the present application.

Accordingly, a need has arisen for a human-computer interface system adapted and configured for emotionally enriching the process of man-machine communication, thereby fulfilling man's natural expectation of the emotional stream complementing information in a manner which is quick, easy, and efficient. The development of human-computer interface system fulfills this need.

A search of the prior art did not disclose any patents that read directly on the claims of the instant invention; however, the following references were considered related:

U.S. Pat. No. 5,367,454, issued in the name of Kawamoto et al.;
U.S. Pat. No. 5,991,735, issued in the name of Gerace;
U.S. Pat. No. 6,697,457 B2, issued in the name of Petrushin;
U.S. Pat. No. 7,949,529 B2, issued in the name of Weider et al.;
U.S. Patent Application no. 2009/0063154 A1, published in the name of Gusikhin et al.; and
U.S. Patent Application no. 2011/0191273 A1, published in the name of Grabarnik et al.

Consequently, a need has been felt for a man-machine interface system adapted and configured for emotionally enriching the process of man-machine communication/interaction.

This application presents claims and embodiments that fulfill a need or needs not yet satisfied by the devices, inventions and methods previously or presently available. In particular, the claims and embodiments disclosed herein describe a human-computer interface system, the system comprising a computer hardware environment which includes a central processing unit, a number of other units interconnected via a system hub, Random Access Memory, Read Only Memory, an input/output adapter for connecting peripheral devices, user interface devices, a communication interface adapter, communication network, server, network repository; an encryption algorithm; sensors or detectors; one or more biometric detectors; output converters; sensor drivers; software modules; expression classification algorithm; a learning database; an update algorithm; a network synchronization algorithm; and a means by which a machine develops and expresses its own emotional states, and which allows the machine to communicate and/or interact with user in an emotionally-expressed manner, the system of the present invention providing unanticipated and nonobvious combination of features distinguished from the devices, inventions and methods preexisting in the art. The applicant is unaware of any device, method, disclosure or reference that discloses the features of the claims and embodiments disclosed herein.

SUMMARY OF THE INVENTION

Briefly described according to one embodiment of the present invention, a human-computer interface system is disclosed for emotionally enriching the process of man-machine communication, fulfilling man's natural expectation of the emotional stream complementing information. The human-computer interface system may be enabled using a hardware implementation comprising a computer or workstation having a central processing unit, and a number of other units interconnected via a system hub. The computer includes Random Access Memory (RAM), Read Only Memory (ROM), and an input/output (I/O) adapter for connecting peripheral devices such as storage devices to the system hub.

User interface devices, such as a keyboard, mouse, and speaker are connected to the system hub, such as via a user interface adapter.

The computer further comprises a communication interface adapter for connecting the computer to a communication network and a display adapter for connecting the system hub to a display device. The communication interface adapter may comprise a wireless communication connection.

The system of the present invention preferably includes an encryption algorithm for preventing unauthorized access to the network database and a server thereof. The server includes a network storage system (repository) for maintaining copies of digital data across the communication interface connections.

The system of the present invention further comprises sensors or detectors and one or more biometric detectors. The computer communicates bi-directionally with the system hub and/or a universal serial bus (USB) hub for connecting the sensors and the one or more biometric detectors. The sensors detect inputs generated by the user and convert the inputs into information which is received and processed by the computer.

The computer generates outputs for the user via output converters which convert the outputs for the user from a format, such as digital, into a format perceivable by user, such as visual, audible, and/or tactile. The output converters output an expression that is most commonly and universally associated with a particular emotion.

The system of the present invention further comprises sensor drivers corresponding to particular sensors. The sensor drivers communicate with software modules, wherein the sensor drivers provide an interface between the sensors and the software modules. The software modules recognize and/or process user input, track user input, and recognize patterns of user input/characteristics. The tracked input/characteristics may then be classified into particular expressions via an expression classification algorithm resulting in expression values indicative of user's current emotional state. The classified or unclassified input/characteristics are time stamped to the particular user input and transmitted via sensor drivers to the mapping algorithm which converts user input into standardized events and transmits them to an update algorithm, which updates the emotional matrix that represents computer's own emotional state, as well as the learning database.

The updated records data is transmitted from the emotional matrix and from the learning database to a network synchronization algorithm which enables records data to be synchronized between the learning database, the emotional matrix, and the network storage system of network.

The system of the present invention further comprises means by which a machine expresses its own emotional states, and which allows the machine to communicate and/or interact with user in an emotionally-expressed manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
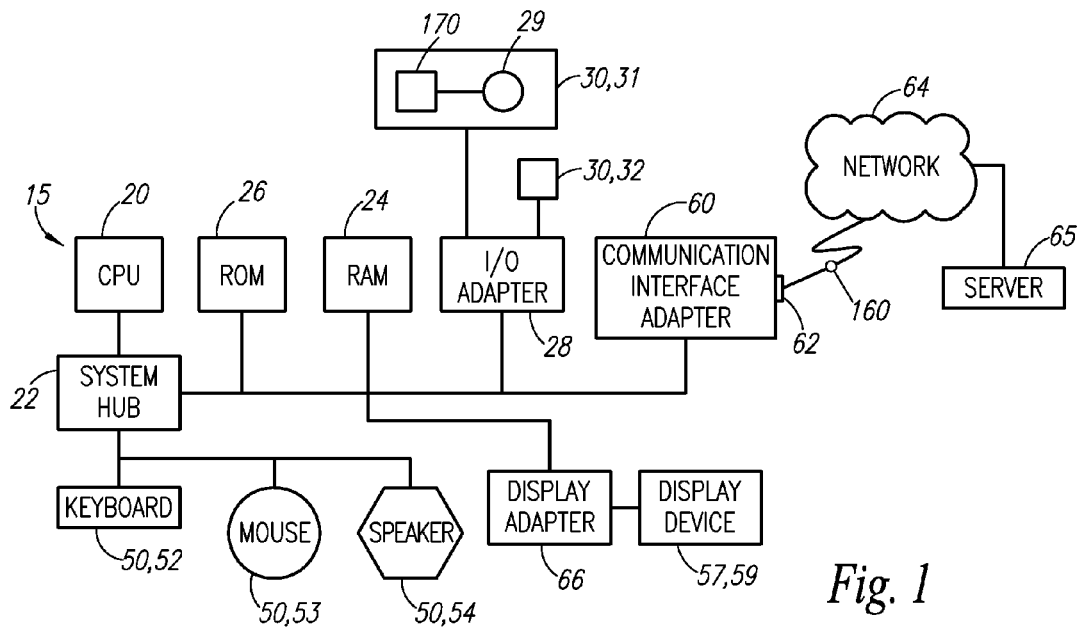
FIG. 1 is a schematic diagram of a computer hardware environment in accordance to one embodiment of the present invention.
Figure 2:
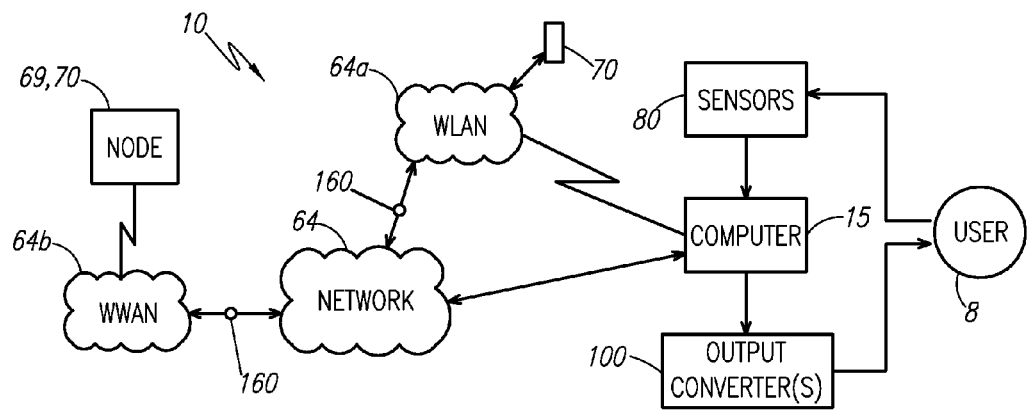
FIG. 2 is a schematic diagram of one possible configuration of the system as described in the description below.
Figure 3:
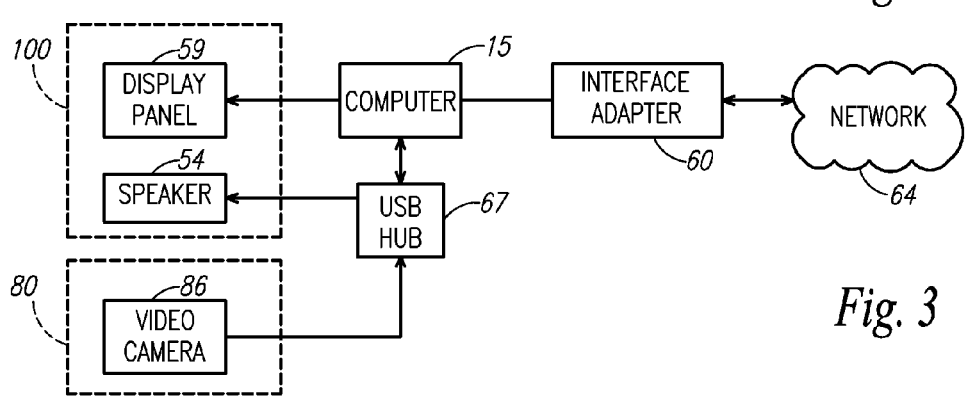
FIG. 3 is a block diagram of an embodiment of a human-computer interface system illustrating sensors and output converters components thereof.
Figure 4:
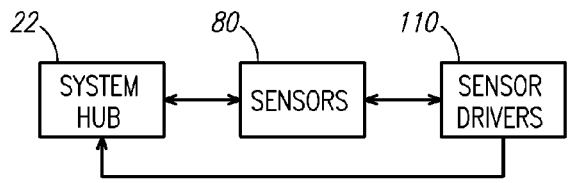
FIG. 4 is a block diagram of a portion of the human-computer interface system illustrating a means for connecting sensors to the computer of the human-computer interface system, in accordance to one embodiment thereof.
Figure 4A:
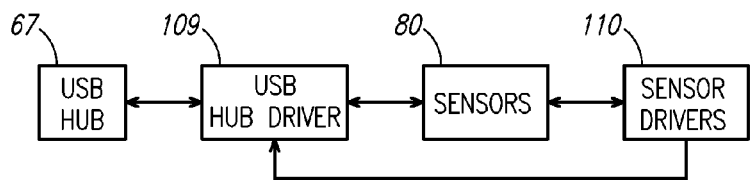
FIG. 4A is a block diagram of a portion of the human-computer interface system illustrating an alternative means for connecting sensors to the computer of the human-computer interface system, in accordance to one embodiment thereof.

Referring now to FIGS. 1-2, in accordance to at least one embodiment of the present invention, a human-computer interface system 10 is disclosed for emotionally enriching the process of man-machine communication, thereby fulfilling man's natural expectation of the emotional stream complementing information. The human-computer interface system 10, hereinafter "system 10", may be enabled using a hardware implementation such as the computer hardware environment illustrated in FIG. 1.

The representative computer hardware environment in accordance to one embodiment of the present invention, and as depicted in FIG. 1, illustrates a typical hardware configuration of a computer 15 or workstation having a central processing unit (CPU) 20, and a number of other units interconnected via a system hub 22. The computer 15 includes Random Access Memory (RAM) 24, Read Only Memory (ROM) 26, and an input/output (I/O) adapter 28 for connecting peripheral devices such as storage devices 30 to the system hub 22. The storage devices 30 include a hard disk 31 and at least one portable storage device 32. An operating system 29, such as but not limited to, DOS, OS/2, Windows®, Macintosh®, and Linux, is installed onto the storage device 30 (hard disk 31) for recall and interaction with the CPU 20. Applications software 170 is installed onto storage device 30 and connected to operating system 29. The applications software 170 comprising two general classes which include systems software and applications software. Systems software comprises low-level programs that interact with the computer 15 at a very basic level, the low-level programs include operating systems, compilers, debuggers, assemblers, file management tools, and utilities for managing computer resources. In contrast, applications software, or "end-user programs" includes database programs, word processors, spreadsheets, graphics generators, communications, and games.

User interface devices 50, such as a keyboard 52, mouse 53, and speaker 54 are connected to system hub 22, such as via a user interface adapter.

Referring now more specifically to FIGS. 1-3, and 8, the computer 15 further includes a communication interface adapter 60 for connecting the computer 15 to a communication network 64 (e.g., a data processing network database) and a display adapter 66 for connecting the system hub 22 to a display device 57, such as a touch screen 84, or a display panel 59, wherein display panel 59 may include, but is not limited to a liquid crystal display (LCD) display panel or a light-emitting diode (LED) display panel. The communication interface adapter 60 may comprise a wireless communication connection 62, such as a wireless local-area network (WLAN) 64a, a wireless wide-area network (WWAN) 64b, and/or a wireless personal area network (WPAN) to facilitate wireless communication between nodes 69 (FIG. 2), the system 10 network database 64, and at least one remote server 65, wherein a node 69 being another computer or some other device, such as a printer and/or a mobile electronic device 70. Mobile electronic device 70 includes, but is not limited to a cellular phone, such as BlackBerry®, iPhone®, Android™, personal digital assistant (PDA), tablet device, such as iPad®, and the like. WPAN may utilize, e.g., Bluetooth® which allows the transmission of data between Bluetooth®-compatible devices such as cellular phones, computers, portable data terminals and bar code printers or scanners.

The system 10 of the present invention preferably includes an encryption algorithm 160 for preventing unauthorized access to the network 64 database, and particularly the server 65, by third parties.

The server 65 includes a network storage system 130 (FIG. 8) for maintaining copies of digital data across the communication interface 60 connections, such as high-speed local-area network (LAN), WLAN 64a, and WWAN 64b. More specifically, the network storage system 130 provides back up for digital data files, databases and other data to the central network 64 which is easily accessed via standard network protocols and tools. The network storage system 130 provides a reliable, external data repository for all computers and nodes 69 on the network 64 to share efficiently. The network storage system 130 may also support automated backup/recovery programs to prevent critical data loss.

The network storage system 130 may comprise a Storage Area Network (SAN) storage or a Network Attached Storage (NAS) storage. SAN storage is typically employed on business networks, the SAN storage utilizing high-end servers, high capacity disk arrays and fibre channel interconnection technology. NAS storage is typically employed on home networks which entails installing NAS devices onto the network (typically LAN) via Transmission Control Protocol/Internet Protocol (TCP/IP). TCP/IP is the suite of communications protocols used to connect hosts on the Internet TCP/IP.

Referring now to FIGS. 3, 4, 4A, and 5, the computer 15 communicates bi-directionally with system hub 22 and/or a universal serial bus (USB) hub 67 for connecting sensors 80 or detectors such as a microphone 82, touch screen 84, video camera 86, (e.g., webcam), motion detector 88, and one or more biometric detectors 89. Biometric detectors 89 include a fingerprint recognition unit, iris and/or retinal scanning recognition unit, face recognition unit, hand recognition unit, signature recognition unit, keystroke recognition unit, voice recognition unit, and/or deoxyribonucleic acid (DNA) recognition unit. Biometric detectors 89 may further include autonomic measuring devices 99 such as a pupil size sensor, skin temperature sensor, blood pressure sensor, pulse rate sensor, brain wave sensor, or other electrical activity indicative of the user 8's emotional state.

Referring now more specifically to FIGS. 2-6, the sensors 80 detect inputs generated by the user 8 and convert the inputs into information, e.g., digital information, which is received and processed by the computer 15. No input, inactivity, or the absence of any human input, e.g., bodily movement or sound production, over a predetermined time interval is also detected by sensors 80 and is converted into information received and processed by the computer 15.

User 8 inputs comprise events or activities which include, but are not limited to audible, visual, and tactile activities or events, such as mouse 53 and keyboard 52 manipulation/engagement, user utterances and silence, user's bodily movements and absence thereof, and computer user activity, such as startup, data entry, shutdown, message (text-message/e-mail) receipt, draft, and send, error, breakdown, computer freeze/lock, and the like.

The computer 15 generates outputs for the user 8 via output converters 100 which convert the outputs for the user 8 from a format, e.g., digital format, into a format perceivable by user 8, such as visual, audible, and/or tactile. The output converters 100 are further configured to output an expression that is most commonly and universally associated with a particular emotion. Output converters 100 comprise a vibratory keyboard 52a, vibratory mouse 53a, display device 57, such as a touch screen 84 or display panel 59, speaker 54, thermogenic device 102, and an illumination device 104, such as one or more light-emitting diodes 105 (LEDs). The vibratory keyboard 52a and vibratory mouse 53 each comprise a conventional vibration device (not shown) actuated upon receipt thereof of a vibration signal transmitted from the CPU 20. The thermogenic device 102 may comprise a heatable mouse, a heatable mouse pad, and/or a heatable keyboard. The thermogenic device 102 comprises a means for generating heat so as to heat the device 102, e.g., heatable mouse, wherein means for generating heat may be via a thermogenesis generating element, or an induction heating or magnetic induction element.

The illumination device 104 comprises one or more light-emitting diodes (LED's) 105, the LED's 105 are configured to be flashed or illuminated in various colors, the color illuminated corresponding to, or commonly and universally associated with a particular emotion. The LEDs 105 may be arranged in an electrical circuit, e.g., matrix, or circuit module comprising an oscillator circuit which allows each LED in the electrical circuit to be sequentially flashed. The LED's 105 may also be arranged and configured to sequentially illuminate in a geometric pattern, e.g., circular.

Other converters 100 are envisioned and within the spirit and scope of the present invention for providing visual, audible, and/or tactile expressions.

Figures 5, 6:
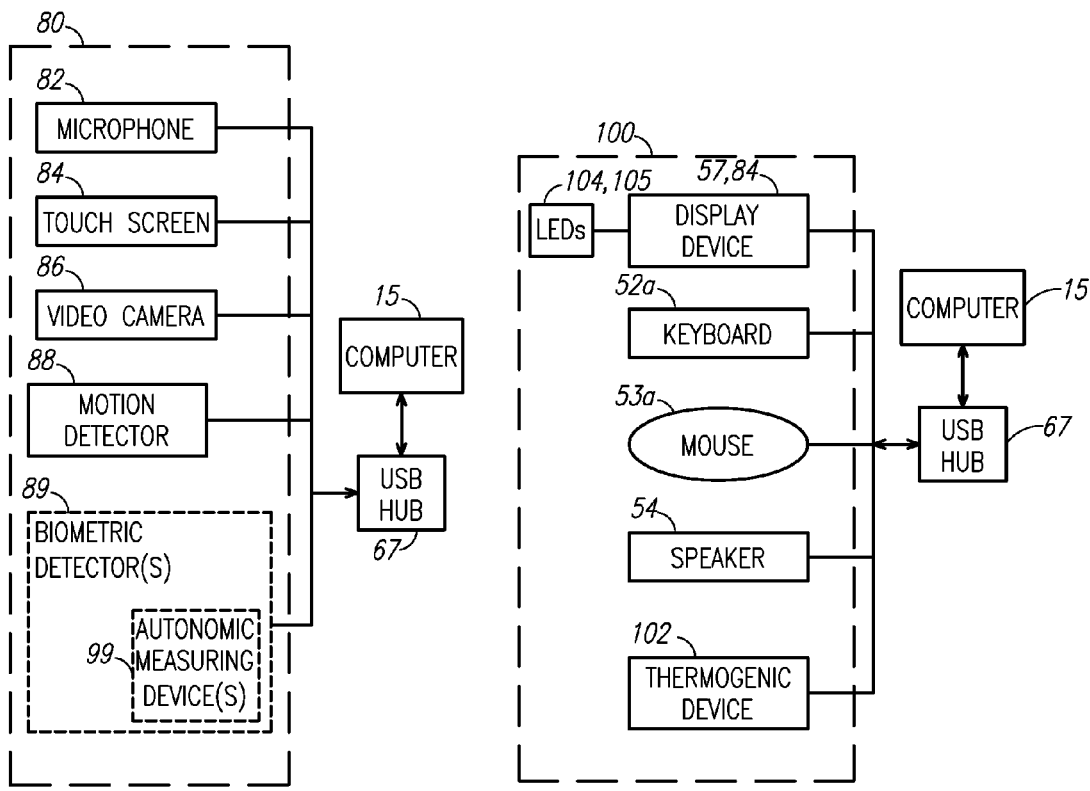
FIG. 5 is a block diagram of a portion of the human-computer interface system illustrating a plurality of sensors, in accordance to one embodiment of the present invention.
FIG. 6 is a block diagram of a portion of the human-computer interface system illustrating a plurality of output converters, in accordance to one embodiment of the present invention.
Figure 7:
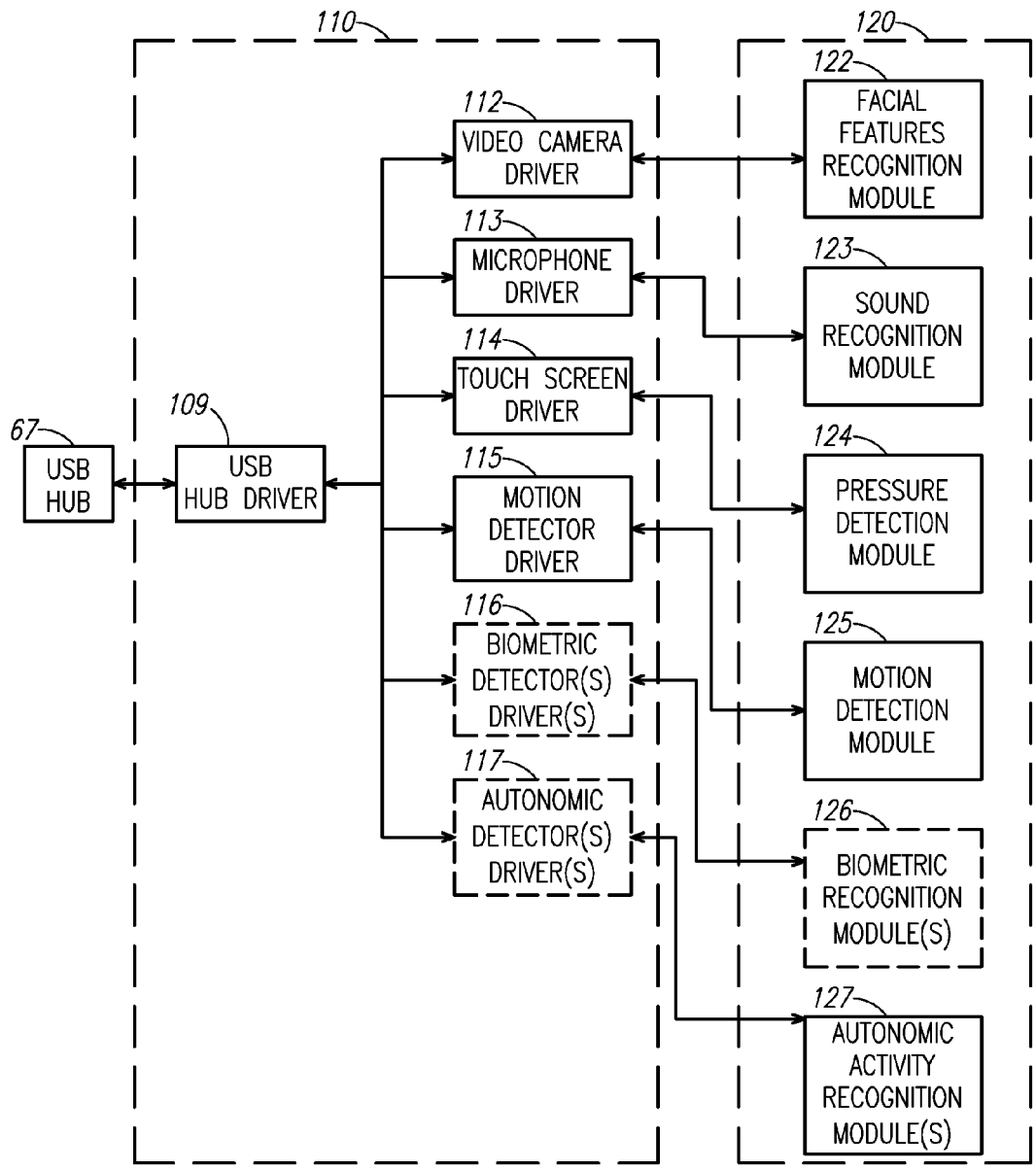
FIG. 7 is a block diagram of a portion of the human-computer interface system illustrating a plurality of sensor drivers and respective software modules, in accordance to one embodiment of the present invention.
Figure 8:
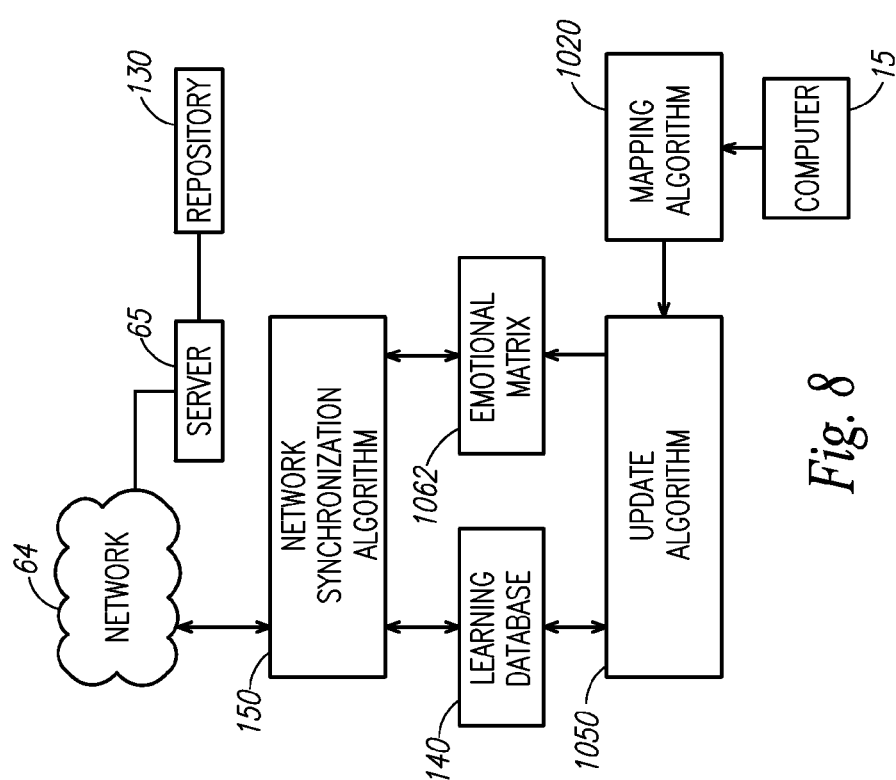
FIG. 8 is a block diagram of a portion of the human-computer interface system illustrating a network synchronization algorithm and update algorithm, in accordance to one embodiment of the present invention.
Figures 10, 11:
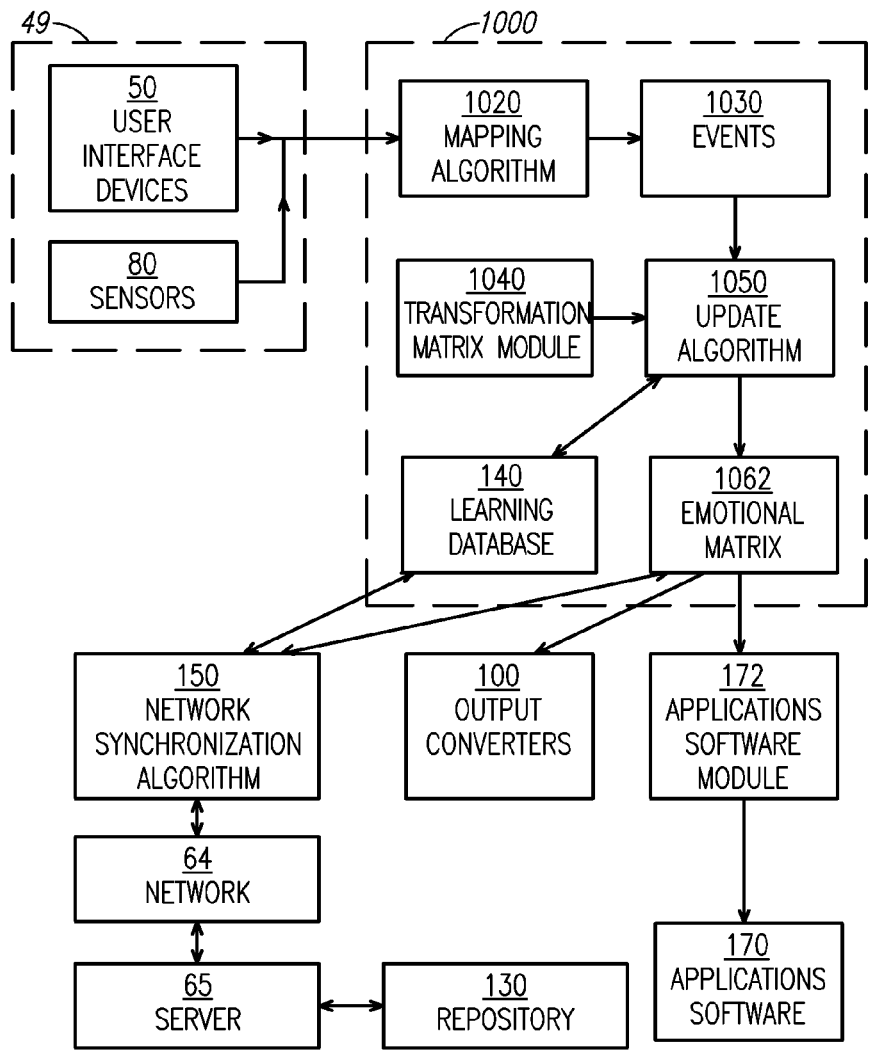
FIG. 10 is a block diagram of a portion of the human-computer interface system illustrating an exemplary hardware platform by which a machine develops and expresses its own emotional states, in accordance to one embodiment of the present invention.
FIG. 11 illustrates one array of the emotion matrix, according to one embodiment of the present invention.

Referring now to FIGS. 2, 5-6, and more particularly to FIGS. 7-8, and 10, the computer 15 may further comprise sensor drivers 110 corresponding to particular sensors 80. The sensor drivers 110 communicate with software modules 120, wherein sensor drivers 110 provide an interface between the sensors 80 and the software modules 120. The software modules 120 recognize and/or process user 8 input(s) and/or characteristics, track user 8 input(s)/characteristics, and recognize patterns of user 8 input(s)/characteristics. The tracked input/characteristics are then classified into particular expressions via an expression classification algorithm, e.g., sequential vector machine, neural network, etc., resulting in generation of expression values indicative of user's 8 current emotional state. Other inputs from user 8 may not be classified as expressing user's emotions. These non-classifiable inputs, along with inputs generated not by user 8, are processed as unclassified inputs. Both classified and unclassified input/characteristics are time stamped and transmitted via sensor drivers 110 to the computer 15 which transmits the time stamped, classified/unclassified input/characteristics to a mapping algorithm 1020.

The mapping algorithm 1020 relates device-dependent classified/unclassified input/characteristics to device-independent, standardized events and sends these events to the update algorithm 1050.

The update algorithm 1050 uses both pre-programmed transformation matrix 1040 and repository of accumulated experience in learning database 140 to convert events to changes to basic emotion values in an emotional matrix 1062 (to be described later in greater detail). Update algorithm 1050 also writes new records and erases outdated records in learning database 140 relating changes to basic emotion values and events coinciding with these changes.

The learning database 140 is a fluid repository, wherein learning database 140 applies the update algorithm 1050 which directs learning base 140 to retain records concerning both the recent past, and records concerning distant past only where such records comprise a strong emotional state value with respect to the particular emotional state, the learning database 140 gradually erasing/deleting records concerning distant past wherein such records comprise weak emotional state values with respect to the particular emotional state. Learning database 140 is updated by update algorithm 1050 and in turn affects the changes to basic emotions calculated by update algorithm 1050 via transformation matrix 1040. Learning database 140 exchanges information with network synchronization algorithm 150.

The emotional matrix 1062 consists of arrays of data for each of 8 basic emotions that represent time-stamped values of these emotions. Emotional matrix 1062 reflects emotional state of the computer and its history of changes. Current emotional state stored in emotional matrix 1062 is further transmitted to output converters 100 and applications software module 172. Emotional matrix 1062 exchanges information with network synchronization algorithm 150.

The updated records data is exchanged between the emotional matrix 1062 and the learning database 140 on one side, and the network synchronization algorithm 150, on the other side. The synchronization algorithm 150 enables records data to be synchronized between the learning database 140 and the emotional matrix 1062 on one side, and the network storage system 130 (repository) of network 64, on the other side. The synchronization algorithm 150 compares processed updated data records of emotional matrix 1062 and updated data records logged in the learning database 140 with records data (time stamped, classified user input/characteristics) logged/recorded and stored in the network storage system 130 of server 65. Synchronization algorithm 150 compares and synchronizes records data between system 10 components, e.g., via data records composition, such as time stamps, data contents, and in accordance to learning database's 140 fluidity feature previously described. Synchronized records data is output from synchronization algorithm 150 to the network storage system 130, the learning database 140, and the emotional matrix 1062.

Now to the input means on FIGS. 5 and 7, the video camera 86, such as a webcam, detects inputs generated by the user 8 and converts the detected inputs into digital data which is transmitted to a video camera driver 112. The video camera driver 112 provides digital video data via an input/output (I/O) stream to a facial features recognition module 122. The facial features recognition module 122 of FIG. 7 processes the digital video data and outputs an expression value indicative of visual features recognized from the user 8 illustrated in FIG. 2. The expression value is a mathematical abstraction of user 8 facial features that may be tracked using a suitable facial or image recognition technique. In accordance to one embodiment, once abstracted and tracked, the sum of the facial features may be calculated, wherein the sum thereof being the expression value. Other methods, or means for utilizing data and statistics, may also be utilized for calculating expression value, such as mean or median calculation of the facial features.

Each facial feature is assigned a feature value. Facial features include, but are not limited to eye gaze direction, tilt direction of head, wrinkling of forehead, nostril expansion, eyebrow movement/orientation, mouth/lip orientation, e.g., open, closed, turned upward, turned downward, open and turned upward, open and turned downward, lips forwardly protruding. The detected facial features are each assigned a feature value associated with a human emotion. In the embodiment of FIG. 7, the facial features recognition module 122 recognizes user 8 facial features, tracks them, and recognizes patterns of facial features movement. The tracked facial features are then classified into particular expressions via an expression classification algorithm, e.g., sequential vector machine, neural network, etc., resulting in expression values indicative of user 8's current emotional state.

The video camera driver 112 provides the expression values data to the USB hub driver 109 which outputs the expression values data to the USB hub 67 for delivery to the CPU 20 which processes and determines the emotion corresponding to the processed expression values data. The CPU 20 outputs the determined emotion (e.g., via determined emotion signal) to machine emotions development and expression software 1000. The machine emotions development and expression software 1000 comprises a mapping algorithm 1020, a transformation matrix module 1040, an update algorithm 1050, a learning database 140, and an emotional matrix 1062.

More specifically, in accordance to one embodiment demonstrated in FIG. 10, the CPU 20 outputs the determined emotion (e.g., via determined emotion signal) to the mapping algorithm 1020 which maps input means 49, such as user interface devices 50 and/or sensors 80, to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotional matrix 1062 and historical data in the learning database 140. The learning database 140 logs the events data related to changes in emotional matrix 1062 indicative of the machine's current emotional state.

The network synchronization algorithm 150 transmits updated events data in real time to and from the network storage system 130, the network storage system 130 logs the events data from learning database 140 and emotion values from emotional matrix 1062, indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile (e.g., vibratory) indicators. Audible expressions may include various sounds comprising any number of tones and volumes. Visual expressions may include a variety of the following: colors, color changes, lights, graphics, fonts, images, videos, text messages/messaging, and the like. Tactile expressions may include, e.g., vibratory and thermogenic.

With respect to colors, it is well known that certain colors are associated with several different emotions and/or feelings. For example, the color red has been associated with anger, warning, fear, blood, horror, debt, excitement, intensity, and love; the color green has been associated with calmness, serenity, tranquility, relaxation, fortuity, envy, environmental, natural, money, and eternal; the color yellow has been associated with cowardice, weakness, and bright; the color blue has been associated with cold, cool, openness, comfort, serenity, peaceful, and security; the color orange has been associated with warmth, energy, enthusiasm, and happiness; the color purple has been associated with royalty, wealth, ambiguity, confusion, dreams, spirituality, and morality; the color white has been associated with purity, cleanliness, hygienic, goodness, and emptiness; the color black has been associated with death, mourning, evil, sinister, doubt, loneliness, emptiness, insecurity, darkness, and mystery; the color pink has been associated with warmth, tenderness, comfort, and affection; the color brown has been associated with strength, reliability, and security; the color gray has been associated with independence and self-reliance; and the color lavender has been associated with grace, elegance, sensitivity, and vulnerability.

The following Table 1 illustrates a non-limiting exemplary application of the recognition module 122 of the present invention, showing recognized and tracked facial features of a user 8 by the recognition module 122.

TABLE 1

| FACIAL FEATURE | FEATURE VALUE |
| --- | --- |
| eye gaze direction | 0 |
| head tilt direction | 0 |
| wrinkling of forehead | |
| vertical wrinkling | 5 |
| horizontal wrinkling | 0 |
| nostril expansion | 10 |
| eyebrow movement/orientation | |
| angled downward | 10 |
| mouth/lip orientation | |
| open | 0 |
| closed | 2 |
| turned upward | 0 |
| open/turned upward | 0 |
| open/turn downward | 0 |
| lips forwardly protruding | 0 |
| TOTAL | 27 |

Table 2 shows exemplary expression value ranges in accordance to particular human emotions.

TABLE 2

| EXPRESSION VALUE | EMOTION |
| --- | --- |
| 1-10 | Sadness |
| 11-20 | Disgust |
| 21-30 | Anger |
| 31-40 | Fear |
| 41-50 | Surprise |
| 51-60 | Happiness |
| 61-70 | Trust |
| 71-80 | Anticipation |

In the above Example 1, user 8's facial features were tracked and assigned an expression value of 27, which lies within the expression value range consistent with the human emotion "anger". Significantly, mapping algorithm 1020, in accordance to one embodiment, converts user device-dependent inputs (e.g., via input means 49) into device-independent events 1030. The events 1030 may be associated with a particular emotional state of a user 8, and as such may actuate change in the emotional state of the machine (computer 15).

For example, depending on contents of the learning database 140, detecting the user 8 to be angry may cause increases to the emotional matrix 1062 values of fear, anger and surprise, while decreasing from happiness and trust.

In other embodiments, the facial features recognition module 122 may employ any suitable image recognition technique. Several such algorithms/methods are known in the art. One method uses a classifier based upon real-valued hyperplanes implemented on specialized hardware for rapid processing. A second method uses spectral graph techniques to cluster shape and appearance features, then groups the clusters into time-varying facial gestures. A third method combines an Adaptive View-based Appearance Model (AVAM) with a 3-D view registration algorithm.

In further accordance to the embodiment of FIG. 7, the microphone 82 detects inputs generated by the user 8 and converts the detected inputs into digital data which is transmitted to a microphone driver 113. The microphone driver 113 provides digital audio via an I/O stream to a sound/voice recognition module 123. The sound recognition module 123 processes the digital audio data and outputs a voice expression value indicative of audio features and/or characteristics recognized from the user 8. The voice expression value is a mathematical abstraction of user 8 voice features that may be tracked using a suitable sound or voice detection or recognition technique. In accordance to one embodiment, voice features include pitch, speaking rate, frequency, and pauses in speech. Other voice features and/or parameters may also be utilized for calculating voice expression value. A predetermined number of user 8 voice features of the voice signal are extracted and tracked as described above. Thereafter, in accordance to one embodiment, the sound recognition module 123 analyzes, abstracts, and tracks user 8 voice features. The tracked voice features are then classified into particular utterances via an utterance classification algorithm, e.g., sequential vector machine, neural network, etc., resulting in utterance or voice expression values indicative of user 8's current emotional state. The microphone driver 113 provides the voice expression values data to the USB hub driver 109 which outputs the voice expression values data to the USB hub 67 for delivery to the CPU 20 which processes and determines the emotion corresponding to the processed voice expression values data. The CPU 20 outputs the determined emotion (e.g., via determined emotion signal) to mapping algorithm 1020 which maps input means 49 to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotion matrix 1062 and historical data in the learning database 140. The learning database 140 logs the events data related to changes in emotion matrix 1062 indicative of the machine's current emotional state.

The network synchronization algorithm 150 transmits updated events data in real time to and from the network storage system 130, the network storage system 130 logs the events data from learning database and emotion values from emotional matrix 1062 indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile indicators.

In accordance to another embodiment, the voice expression value of extracted and tracked voice features is determined by calculating one or more of the following statistical variables which includes, but is not limited to: (a) a maximum value of pitch, speaking rate, speaking frequency, and/or speaking pauses; (b) standard deviation of the pitch, speaking rate, speaking frequency, and/or speaking pauses; (c) a range of the pitch, speaking rate, speaking frequency, and/or speaking pauses; and (d) a mean of the pitch, speaking rate, speaking frequency, and/or speaking pauses. Utilizing one or more of the statistical variables selected in (a)-(d) above, a voice expression value is generated, the generated voice expression value being associated with user 8's current emotional state. The microphone driver 113 provides the voice expression value data to the USB hub driver 109 which outputs the voice expression value data to the USB hub 67 for delivery to the CPU 20 which processes and determines the emotion corresponding to the processed voice expression value data. The CPU 20 outputs the determined emotion to mapping algorithm 1020 which maps input means 49 to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotion matrix 1062 and historical data in the learning database 140. The learning database 140 logs the events data related to changes in emotion matrix 1062 indicative of the machine's current emotional state.

The network synchronization algorithm 150 transmits updated events data in real time to and from the network storage system 130, the network storage system 130 logs the events data from learning database and emotion values from emotional matrix 1062 indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile indicators.

The touch screen 84 detects inputs generated by the user 8 and converts the detected inputs into digital data which is transmitted to a touch screen driver 114. The touch screen driver 114 provides digital applied force data via an I/O stream to a pressure detection module 124. The pressure detection module 124 processes the digital applied force data and outputs a measured force expression value indicative of applied force recognized from the user 8. The measured force expression value is a mathematical abstraction of a series of user 8 applied forces that may be tracked using a suitable pressure detection or recognition technique known or apparent to those of ordinary skill in the art.

A predetermined number of the series of user 8 applied forces are extracted and tracked as described above. Thereafter, in accordance to one embodiment, the pressure detection module 124 analyzes, abstracts, and tracks the series of user 8 applied forces. The tracked series of forces are then classified into particular measured force data via a force measure classification algorithm, e.g., sequential vector machine, neural network, etc., resulting in a measured force expression value indicative of user 8's current emotional state. The touch screen driver 114 provides the measured force expression values data to the USB hub driver 109 which outputs the measure force expression value data to the USB hub 67 for delivery to the CPU 20 which processes and determines the emotion corresponding to the processed measured force expression value data. The CPU 20 outputs the determined emotion to mapping algorithm 1020 which maps input means 49 to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotion matrix 1062 and historical data in the learning database 140. The learning database 140 logs the events data related to changes in emotion matrix 1062 indicative of the machine's current emotional state.

The network synchronization algorithm 150 transmits updated events data in real time to and from the network storage system 130, the network storage system 130 logs the events data from learning database and emotion values from emotional matrix 1062 indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile indicators.

The motion detector 88, such as infrared, detects inputs by the user 8, within a defined area and within defined parameters, and converts the detected inputs into digital data which is transmitted to a motion detector driver 115. The motion detector driver 115 provides digital motive data via an I/O stream to a motion detection module 125. The motion detection module 125 processes the digital motive data and outputs a motive expression value indicative of movement recognized from the user 8. The motion expression value is a mathematical abstraction of movements of user 8 that may be tracked using a suitable motion detection or recognition technique known or apparent to those of ordinary skill in the art.

A predetermined number of user 8's movements are extracted and tracked as described above. Thereafter, in accordance to one embodiment, the motion detection module 125 analyzes, abstracts, and tracks the movements of user 8. The tracked series of movements are then classified into particular bodily movement expressions via a bodily movement classification algorithm, e.g., sequential vector machine, neural network, etc., resulting in a motive expression value indicative of user 8's current emotional state. The motion detector driver 115 provides the motive expression value data to the USB hub driver 109 which outputs the motive expression value data to the USB hub 67 for delivery to the CPU 20 which processes and determines the emotion corresponding to the processed motive expression value data. The CPU 20 outputs the determined emotion to mapping algorithm 1020 which maps input means 49 to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotional matrix 1062 and historical data in the learning database 140. The learning database 140 logs the events data related to changes in emotional matrix 1062 indicative of the machine's current emotional state.

The network synchronization algorithm 150 transmits updated events data in real time to and from the network storage system 130, the network storage system 130 logs the events data from learning database and emotion values from emotional matrix 1062 indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile indicators.

As previously disclosed, the biometric detectors 89 include a fingerprint recognition unit, iris and/or retinal scanning recognition unit, face recognition unit, hand recognition unit, signature recognition unit, keystroke recognition unit, voice recognition unit, and/or deoxyribonucleic acid (DNA) recognition unit. Biometric detectors 89 may further include autonomic measuring devices 99 such as a pupil size sensor, skin temperature sensor, blood pressure sensor, pulse rate sensor, brain wave sensor, or other electrical activity indicative of the user 8's emotional state. The biometric detectors 89 are each adapted and configured for recognizing and/or identifying a measurable characteristic unique to user 8.

In accordance to one exemplary embodiment of the present invention, the one or more biometric detectors 89 detects biometric input(s) generated by the user 8 and converts the detected input(s) into digital data which is transmitted to a one or more biometric detectors driver(s) 116 corresponding respectively to the one or more biometric detectors 89. The one or more biometric detector driver(s) 116 provides digital biometric data via an input/output (I/O) stream to a one or more biometric recognition module(s) 126 corresponding respectively to the one or more biometric detector driver(s) 116. The one or more biometric recognition module(s) 126 of FIG. 7 processes the digital biometric data and outputs a biometric expression value indicative of biometric characteristics recognized from the user 8. The biometric detector driver(s) 116 provides the biometric expression values data to the USB hub driver 109 which outputs the biometric expression values data to the USB hub 67 for delivery to the CPU 20 which processes and determines the emotion corresponding to the processed biometric expression values data. The CPU 20 outputs the determined emotion to the mapping algorithm 1020 which maps input means 49 to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotional matrix 1062 and historical data in the learning database 140. The learning database 140 logs the events data related to changes in emotional matrix 1062 indicative of the machine's current emotional state.

The network synchronization algorithm 150 transmits updated events data in real time to and from the network storage system 130, the network storage system 130 logs the events data from learning database and emotion values from emotional matrix 1062 indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile indicators.

In further accordance to the instant exemplary embodiment concerning biometric detectors 89 systems, biometric signal processing algorithms may be provided for performing quality control activities and developing one or more biometric templates. Biometric database storage may be provided for storing information from which newly generated biometric templates may be compared to. A biometric matching algorithm may be provided for comparing a newly generated biometric template to one or more biometric templates stored in biometric database storage. Thus, processing by the one or more biometric recognition module(s) 126 may include the steps of comparing, matching, and recognizing and/or identifying biometric template.

In accordance to another exemplary embodiment of the present invention, one or more autonomic measuring devices 99 detects autonomic input(s) by the user 8 and converts the detected input(s) into digital data which is transmitted to a one or more autonomic detector driver(s) 117 corresponding respectively to the one or more autonomic measuring devices 99. The one or more autonomic detector driver(s) 117 provides digital autonomic data via an input/output (I/O) stream to a one or more autonomic activity recognition module(s) 127 corresponding respectively to the one or more autonomic detector driver(s) 117. The one or more autonomic activity recognition module(s) 127 of FIG. 7 processes the digital autonomic data and outputs an autonomic expression value indicative of autonomic characteristics recognized from the user 8. The autonomic detector driver(s) 117 provides the autonomic expression values data to the USB hub driver 109 which outputs the autonomic expression values data to the USB hub 67 for delivery to the CPU 20 which processes and determines the emotion corresponding to the processed autonomic expression values data.

The CPU 20 outputs the determined emotion to the mapping algorithm 1020 which maps input means 49 to input means-independent events 1030, wherein the events 1030 are defined to trigger changes in computer's emotional state. Mapped events 1030 data is output to an update algorithm 1050 that uses a transformation matrix module 1040 and learning database 140 to relate each event 1030 with a corresponding basic change to each of the basic emotions. The update algorithm 1050 updates emotional data in the emotion matrix 1062 and historical data in the learning database 140. The learning database 140 logs the events data related to changes in emotional matrix 1062 indicative of the machine's current emotional state.

The network synchronization algorithm 150 transmits updated events data in real time to and from the network storage system 130, the network storage system 130 logs the events data from learning database and emotion values from emotional matrix 1062 indicative of machine's current emotional state. Updated events data is synchronized between the learning database 140 and the network storage system 130 (repository) of network 64 via the network synchronization algorithm 150. Similarly, updated emotional state of the computer is synchronized between the emotional matrix 1062 and the network storage system 130. Finally, an updated emotion signal is sent from emotional matrix 1062 to one or more output converters 100, wherein the one or more output converters 100 outputs one or more emotion expressions being most commonly and universally associated with the determined emotion signal. The one or more emotion expressions are expressed in a format perceivable by user 8, the format being in the form of audible, visual and/or tactile indicators.

Because the system 10 of the present invention is adapted and configured to output one or more emotion expressions most commonly and universally associated with a determined emotion, the present invention is an axiomatic system useful for all cultures, and therefore absent of language barriers.

Figure 9:
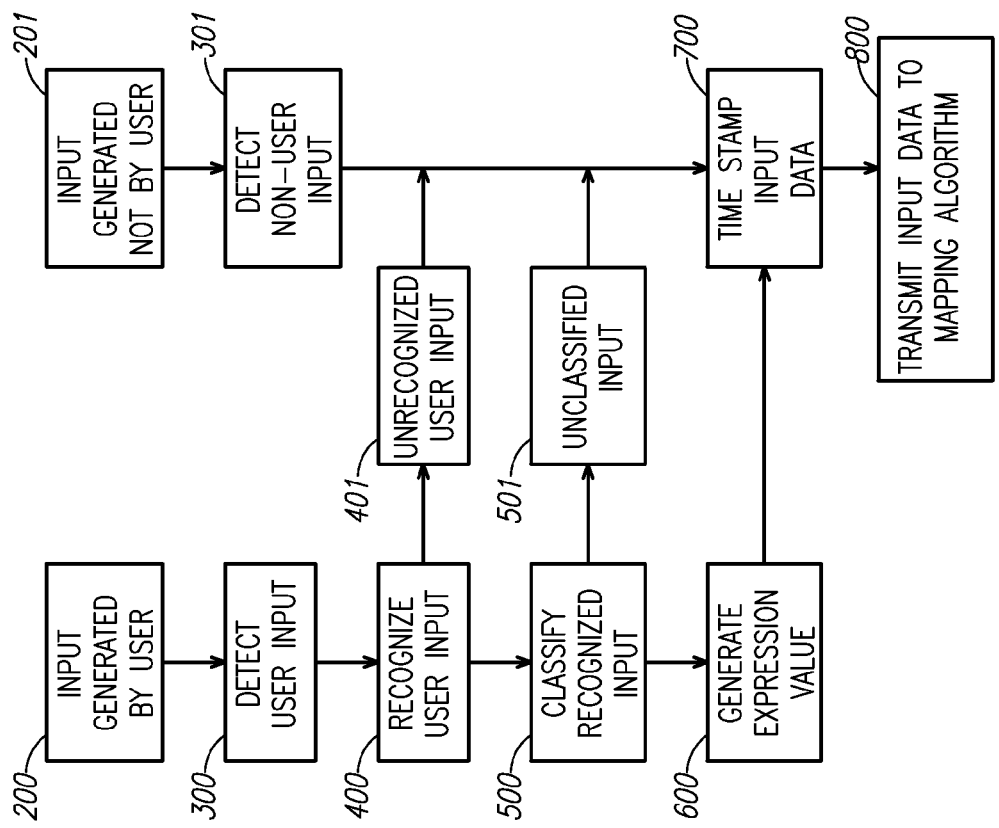
FIG. 9 is a block diagram of one method of the system described hereinbelow.

Generally, a method for emotionally enriching man-computer communication/interaction may be described in accordance with the representation depicted in FIG. 9, in which the user 8 generates input at 200, wherein user 8 input is detected by at least one sensor 80 at 300. The detected input is recognized by software module(s) 120 at 400. The recognized user 8 input is classified, via an expression classification algorithm, into particular expressions at 500, wherein the expression classification algorithm generates expression values at 600, the expression values indicative of user's 8 current emotional state. The classified input data is time stamped at 700 and is transmitted to the mapping algorithm 1020 at 800. Alternatively, inputs generated not by the user 8 at 201, are detected by sensors 80 at 301 and then time-stamped at 700 along with user input rejected by recognition module through 401 or by classification module through 501. Inputs taking this alternative path are similarly sent to the mapping algorithm 1020 at 800 as they may also cause changes in computer's own emotional state.

Figures 12, 13:
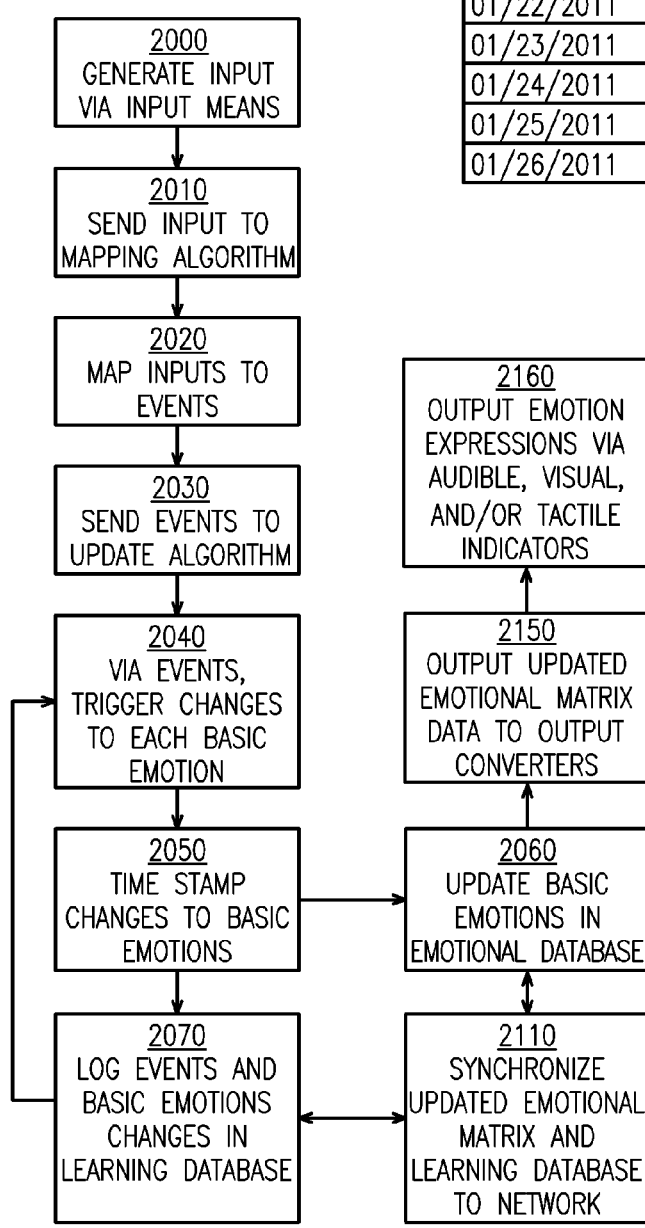
FIG. 12 illustrates another array of the emotion matrix, according to one embodiment of the present invention.
FIG. 13 is a block diagram of an additional method of the system described hereinbelow.

Referring now to FIGS. 10-12, the system 10 of the present invention being more specifically described, input generated via the input means 49, such as user interface devices 50 and/or sensors 80, is transmitted therefrom to the mapping algorithm 1020, the mapping algorithm 1020 mapping user interface devices/sensors 50/80 to user interface devices/sensors-independent events 1030, wherein events 1030 are defined to trigger changes in computer's emotional state. Events 1030 include computer and/or computer user activity, such as startup, data entry, shutdown, message (text-message/e-mail) receipt, draft, and send, error, breakdown, computer freeze/lock, and the like. One mapping event 1030 may be defined as, for example, "signal output from keyboard 52 or touch screen 84 is mapped to 'person works with me' event". Another mapping event 1030 may be defined as, for example, "shutdown command input via a computer 15 key, button, mouse 53, or microphone 82 is mapped to 'person leaves me' event". Mapped events 1030 data is output to an update algorithm 1050 that calculates changes to computer's emotional state using a transformation matrix module 1040, which provides each event 1030 with a corresponding basic change (increase, decrease, or unchanged/constant emotion value) to each of the basic emotions or "emotional variables". The transformation matrix module 1040 data is modified by a comparison to the contents of learning database 140, and then applied by update algorithm 1050 to event 1030. Output of the update algorithm 1050 are time-stamped new values for each of the basic emotions in an emotional matrix 1062 and time-stamped records of events related to changes in emotional variables written into a learning database 140. The emotional matrix 1062 stores data indicative of machine's current emotional state. The emotional matrix 1062 comprises an array for each of the emotion classes or basic emotions, the emotion classes may comprise eight in number. Each array comprises a plurality of emotion values along with time stamps, where for each basic emotion the value with the most recent time stamp represents the computer 15 current emotional state. In reference to FIG. 11, one array of the emotional matrix 1062 illustrates the single emotion class "Joy" was recorded as having an emotion value of 57% with time stamp of Jan. 1, 2011. In reference to FIG. 12, another array of the emotional matrix 1062 illustrates the emotion class "Anticipation" recorded as having an emotion value of 57% with time stamp of Jan. 1, 2011.

For example, to describe the operational relationship between events 1030, update algorithm 1050 and transformation matrix module 1040, in accordance to one exemplary embodiment, where event 1030 is "person works with me event" 1030, the emotion values for joy, trust, and anticipation are increased; the emotion values for fear, anger, and sadness are decreased; and the emotion values for surprise and disgust remain unchanged or constant.

The time stamped, events data is transmitted from learning database 140 to an update algorithm 1050, which enables the real-time modification of the calculation of changes to emotional values by the update algorithm 1050 in emotional matrix 1062 depending on the experience accumulated in learning database 140 into which the updated events data (including emotion values and emotion value changes) is processed and logged, respectively. Updated events data are further exchanged in real time with the network storage system 130 or repository of network 64, the network storage system 130 logging the events data, emotion values, and emotion value changes/differential indicative of machine's (computer's 15) current emotional state therein.

The learning database 140 is a fluid repository, wherein emotional matrix 1062 applies the update algorithm 1050, which increases or decreases each emotion value based upon the history of a particular emotion stored in the learning database 140. For example, regarding a current event 1030, which is recognized as a particular emotion, and where the learning database 140 comprises a history which includes a recent peak of this same determined emotion, the current emotion value increase, based upon the current event 1030, will be reduced, thereby providing a saturation effect. By way of another example, in the event learning database 140 contains a same current event 1030 which recently caused a large change in a particular emotion, the change of the new emotion value based upon this current event 1030 will decrease, thereby providing a diminishing response to a particular stimulus (the particular current event 1030). By way of yet another example, in the event learning database 140 contains a same current event 1030 which coincides with a high emotion value of a particular emotion, the change of the new emotion value will increase, thereby providing the system 10 of the present invention with a conditioning mechanism.

The following Table 3 illustrates a non-limiting exemplary application of time stamped events 1030 logged into the learning database 140 of the present invention.

TABLE 3

| DATE/TIME STAMP | TYPE | EVENT | VALUE/ CHANGE | EMOTION |
|---|---|---|---|---|
| Jan. 1, 2011 | Change | Start Up | 57% | Joy |
| Jan. 10, 2011 | Peak | Data Entry | 83% | Trust |
| Jan. 21, 2011 | Peak | Shutdown | 17% | Sadness |
| Jan. 22, 2011 | Change | Message | 18% | Surprise |
| Jan. 23, 2011 | Change | Error | 19% | Anger |
| Jan. 24, 2011 | Change | Breakdown | 11% | Fear |
| Jan. 25, 2011 | Peak | Message | 7% | Joy |
| Jan. 26, 2011 | Peak | Message | 10% | Surprise |

The learning database 140 also applies the update algorithm 1050 which directs learning database 140 to retain records concerning both the recent past, and records concerning distant past only where such records comprise a strong emotional state value with respect to the particular emotional state, the learning database 140 gradually erasing/deleting records concerning distant past wherein such records comprise weak emotional state values with respect to the particular emotional state.

The updated events data is transmitted from the learning database 140 to the network synchronization algorithm 150. The synchronization algorithm 150 enables events data to be synchronized between the learning database 140 and the emotional matrix 1062 on one side, and the network storage system 130 (repository) of network 64 on the other side. The synchronization algorithm 150 compares processed updated values of each basic emotion in the emotional matrix 1062 and updated events data logged in the learning database 140 with records data (time stamped, events data) logged and stored in the network storage system 130 of server 65. Synchronization algorithm 150 compares and synchronizes events data between system 10 components, e.g., via data records composition, such as time stamps, data contents, data events contents, and in accordance to learning database's 140 fluidity feature previously described. Synchronized events data is output from synchronization algorithm 150 to the network storage system 130, the learning database 140, and the emotional matrix 1062, the emotional matrix 1062 outputting a determined emotion signal to one or more output converters 100.

The output converters 100 convert the outputs for the user 8 from a format, e.g., digital format, into a format perceivable by user 8, such as visual, audible, and/or tactile. The output converters 100 are further configured to output at least one expression, the at least one expression being most commonly and universally associated with a particular emotion.

In accordance to an exemplary embodiment, wherein anger is the determined computer's emotion, anger is expressed in the form of an indicator, wherein the indicator is shown in FIG. 6 as a visual indicator comprising flashing red LEDs 105 positioned so as to be observable by user 8. The LEDs 105 may be suitably disposed about the upper surface of the frame supporting the screen of the display device 57, or otherwise positioned so as to be viewable by user 8.

As previously described, the one or more emotion expressions output by the at least one output converter 100 are expressed in a format perceivable by user 8, the format being in the form of audible, visual and/or tactile indicators.

It is therefore envisioned two or more output converters 100 may be employed to express the determined emotion in a contemporaneous manner. For example, in the above instance where anger is the determined emotion, the CPU 20 may output the determined emotion signal to the speaker 54 and display panel 59 which contemporaneously output a high pitched scream and red flashing graphics illuminating across the screen of the display device 57, respectively. It is further envisioned that the at least one output converter 100 may output the emotion expression over a predetermined limited duration.

In accordance to another example, wherein anger is the determined emotion, the CPU 20 may output the determined emotion signal to the speaker 54, the display panel 59, and a vibrating mouse 53a which contemporaneously output a high pitched scream, red flashing graphics illuminating across the screen of the display device 57, and vibration of vibratory mouse 53a and/or vibratory keyboard 52a, respectively.

Similar to colors, it is also well known that certain sounds, such as particular genres of music, are associated with several different emotions and/or feelings. For example, jazz has been associated with chaos, classical has been associated with relaxation, and heavy metal has been associated with anger and aggression. Thus, in any one of the above examples, wherein anger was the determined emotion, the CPU 20 may transmit the determined emotion signal to the speaker 54 from which a tune of heavy metal rock is expressed.

Further, in the event relaxation and/or calmness were the determined emotion, CPU 20 may transmit such determined emotion signal to the speaker 54 and the plurality of LEDs 105. The determined emotion (relaxation) may be expressed contemporaneously from the speaker 54 and LEDs 105 as a tune of classical music, and flashing green LEDs 105, respectively.

As another example of output converter's function, computer's emotional state may be represented by subtle changes to operational environment, such as screen's color scheme, sound scheme, choice of words in dialogs and/or choice of background music.

Significantly, as described and shown hereinabove, the system 10 of the present invention is configured and adapted to allow a machine (computer 15) to develop and express its own emotional states, thereby allowing the machine (computer 15) to communicate and/or interact with user 8 in an emotionally-expressed manner. Thus, the system 10 of the present invention presents novel, unanticipated, and nonobvious combination of functions and features distinguished from the devices, inventions and methods preexisting in the art.

One or more emotion expressions may be output by the one or more output converters 100, the output expressions are expressed in a format perceivable by user 8, the format being in the form of audible, visual and/or tactile indicators. For example, anger may be output from the speaker 54 as higher volume sound and also as red-toned graphics illuminating across the screen of the display device 57 and/or flashing red LEDs 105. Anger may also be output in the form of an explicit message displayed across the screen of the display device 57, or in the form of a message e.g., text message or e-mail, transmitted to a mobile device 70; wherein such message may read, for example, "I AM VERY ANGRY!!!"

As previously described, the encryption algorithm 160 is included for preventing unauthorized access to the network 64 database, and particularly the server 65, by third parties.

In further accordance to the present invention, an applications software module 172 connects the applications software 170 to the computer 15, the applications software module 172 is adapted and configured for modifying applications software 170 outputs, the modified outputs reflecting or exhibiting emotional expressions consistent with the machine's determined emotional state.

In accordance to one exemplary embodiment, wherein the applications software 170 is an e-mail program, one output generated by the e-mail program is expressed in the form of a sound when receiving an e-mail message. The applications software module 172 modifies the sound output of the e-mail program so as to be consistent with the current determined emotional state of machine at the time an e-mail message is received. For example, in the event anger is the determined emotion of machine, the CPU 20 transmits the determined emotion signal (anger) to applications software module 172 which modifies applications software 170 (e-mail program) sound output so as to be consistent with the determined emotion signal, the applications software module 172 transmitting a signal received by CPU 20 to output the determined emotion signal (anger) to the speaker 54 which outputs, e.g., a high pitched scream or a tune of heavy metal rock upon the receipt by the e-mail program of an e-mail message.

For purposes of brevity and obviating redundancy, the output expressions according to the instant embodiment, comprise but are not limited to the expression indicators methods, elements, types, features, and advantages in accordance to the audible, visual and/or tactile indicators as previously described hereinabove.

Generally, a further method for emotionally enriching man-computer communication/interaction may be described in accordance with the representation depicted in FIG. 13, in which input is generated via input means 49 at 2000, wherein generated input is received by mapping algorithm 1020 at 2010, the mapping algorithm 1020 mapping input means 49 to input means-independent events 1030 at 2020, wherein events 1030 are defined to trigger changes in computer's emotional state. Mapped events 1030 data is output to an update algorithm 1050 at 2030, the update algorithm 1050 providing each event 1030 with a corresponding basic change to each of the basic emotions at 2040. The update algorithm 1050 time-stamps data at 2050, then outputs revised events data to learning database 140 at 2070. The update algorithm 1050 outputs revised values of basic emotions to the emotional matrix 1062 at 2060, indicating machine's current emotional state.

The computer 15 synchronizes updated events data from learning database 140 and values associated with basic emotions from emotional matrix 1062 in real time with the network storage system 130 at 2110, the network storage system 130 logging the events data, emotion values, and emotion value changes/differential indicative of machine's current emotional state. The emotional matrix 1062 sends determined emotion signals to one or more output converters 100 at 2150, wherein the one or more output converters 100 outputs one or more emotion expressions being most commonly and universally associated with the determined emotion signal at 2160, the one or more emotion expressions are expressed in a format perceivable by user 8, the format being in the form of audible, visual and/or tactile indicators.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A human-computer interface system, the system comprising:
   a computer, the computer comprises:
      a central processing unit;
      a first memory;
      a second memory;
      at least one storage device;
      a system hub;
      an input/output adapter for connecting the at least one storage device to the system hub;
      an operating system installed onto the at least one storage device for recall and interaction with the central processing unit;
      applications software installed onto the at least one storage device, the applications software is connected to the operating system;

a communication network;
a communication interface adapter for connecting the computer to the communication network;
at least one remote server;
a display device;
a display adapter for connecting the system hub to the display device;
means for inputting and detecting data and commands generated by a user;
a plurality of output converters; and
a means for allowing the computer to develop and express the computer's emotional states, the means for allowing the computer to develop and express the computer's emotional states comprises machine emotions development and expression software, the machine emotions development and expression software further comprising:
an update algorithm, the update algorithm outputs updated emotions data;
a mapping algorithm, the mapping algorithm maps at least one of device-dependent classified input, device-dependent unclassified input, device-dependent classified characteristics, and device-dependent unclassified characteristics to device-independent, standardized events, and outputs mapped events to the update algorithm;
a transformation matrix module, the transformation matrix module supplies the update algorithm with instructions for relating the mapped events with a corresponding basic change(s) to each emotion of basic emotions;
an emotional matrix, the emotional matrix inputs the updated emotions data output from the update algorithm; and
a learning database.

2. The system of claim 1, wherein the communication network is defined as a data processing network database comprising at least one server.

3. The system of claim 1, wherein the communication interface adapter comprises a wireless communication connection.

4. The system of claim 1, wherein the computer generates outputs via the plurality of output converters, the plurality of output converters converts the computer-generated outputs into a user-perceivable output.

5. The system of claim 1, further comprising a universal serial bus hub, the computer communicates bi-directionally with the system hub and/or the universal serial bus hub for connecting the input means.

6. The system of claim 1, further comprising an encryption algorithm for preventing unauthorized access to the communication network.

7. The system of claim 2, wherein the server comprises a network storage system.

8. The system of claim 5, wherein the input means comprises a plurality of user interface devices.

9. The system of claim 5, wherein the input means comprises a plurality of sensors.

10. The system of claim 1, further comprising:
software modules; and
input means drivers, the input means drivers are connected to corresponding input means, the input means drivers communicate with corresponding software modules, wherein the input means drivers providing an interface between the input means and the software modules.

11. The system of claim 10, wherein the software modules recognize and/or process user input(s) and/or characteristics, track user input(s) and/or characteristics, and recognize patterns of user input(s) and/or characteristics.

* * * * *